United States Patent [19]

Castegnier

[11] Patent Number: 4,661,222

[45] Date of Patent: Apr. 28, 1987

[54] MONOCHROMIC AND POLYCHROMIC PRINTING OF AN IMAGE REPRODUCED BY ELECTRO-COAGULATION OF A COLLOID

[75] Inventor: Adrien Castegnier, Outremont, Canada

[73] Assignee: Elcorsy Inc., Quebec, Canada

[21] Appl. No.: 844,885

[22] Filed: Mar. 27, 1986

[51] Int. Cl.[4] .............................................. B01D 57/02

[52] U.S. Cl. .............................. 204/180.9; 204/181.1; 204/180.1; 204/299 R; 204/300 R

[58] Field of Search ........ 204/299 R, 300 R, 299 EC, 204/300 EC, 180.9, 181.1, 180.1

[56] References Cited

U.S. PATENT DOCUMENTS

| | | | |
|---|---|---|---|
| 3,753,885 | 8/1973 | Hammond | 204/180.9 |
| 3,892,645 | 7/1975 | Castegnier | 204/180 |
| 4,115,234 | 9/1978 | Anselrode | 204/180.2 |
| 4,330,788 | 5/1982 | Hinz et al. | 204/300 R |
| 4,555,320 | 11/1985 | Castegnier | 204/180.9 |
| 4,566,962 | 1/1986 | McGinniss | 204/180.9 |

*Primary Examiner*—Arthur P. Demers
*Attorney, Agent, or Firm*—Schwartz, Jeffery, Schwaab, Mack, Blumenthal & Evans

[57] ABSTRACT

A method and apparatus for reproducing an image and transferring same onto an end-use support. A positive electrolytically inert electrode is provided in the form of an endless elongated belt moving at substantially constant speed along a closed horizontal path and having an electrode active surface extending vertically. A plurality of negative electrolytically inert electrodes which are electrically insulated from one another are arranged side-by-side in rectilinear alignment to define a series of corresponding electrode active surfaces disposed transversely of the belt and spaced from the positive electrode active surface thereof by a constant predetermined electrode gap. The electrode gap is filled with a substantially liquid colloidal dispersion containing an electrolytically coagulable colloid, a liquid dispersing medium and a soluble electrolyte and having a substantially constant temperature. Selected ones of the negative electrodes are electrically energized to cause point-by-point selective coagulation and adherence of the colloid onto the positive electrode active surface of the belt opposite the electrode active surface of the energized negative electrodes while the belt is moving, thereby forming a series of corresponding dots of coagulated colloid representative of a desired image. Any remaining non-coagulated colloid is then removed from the positive electrode active surface. The colloid is treated either before or after the coagulation thereof to obtain dots of colored, coagulated colloid which are thereafter contacted with an end-use support to cause transfer of the coloring agent onto the end-use support and thereby imprint the end-use support with the image.

50 Claims, 14 Drawing Figures

20A
20B
20C
20D
22
24
24'
26
28
30
32
34
36
38
38'
38"
40
42
44
46
48
50
52
54
54A
54B
56
58
60
62

MONOCHROMIC AND POLYCHROMIC PRINTING OF AN IMAGE REPRODUCED BY ELECTRO-COAGULATION OF A COLLOID

BACKGROUND OF THE INVENTION

The present invention relates to improvements in the field of monochromic and polychromic dynamic printing. More particularly, the invention is concerned with an improved method and apparatus for reproducing an image by electro-coagulation of an electrolytically coagulable colloid and transferring the image thus reproduced onto an end-use support, such as paper.

Applicant has already described in his U.S. Pat. No. 3,892,645 of July 1, 1975 an electrolytic printing method and system in which a thin layer of a liquid composition containing a colloid such as gelatin or albumin, water and an electrolyte is interposed between at least one pair of opposite negative and positive electrodes spaced from one another to define a gap which is filled by the liquid composition. In one embodiment, there is a plurality of electrically-insulated juxtaposed negative electrodes and selected ones thereof are electrically energized to pass electric pulses through the layer at selected points to cause point-by-point selective coagulation and adherence of the colloid in variable thickness on the positive electrode directly opposite each energized negative electrode, thereby forming imprints.

It is very important that the gap between the negative and positive electrodes by uniform throughout the active surfaces of the electrodes since otherwise there will be a variation in the thickness of the layer and thus a corresponding variation of the electrical resistance thereof at different locations between the electrodes, which will result in a non-uniform image reproduction as the thickness of the coagulated colloid is proportional to the amount of current passed through the layer. As this gap is of the order of 50μ, its uniformity is of course very difficult to control. This is especially true in the case where the positive electrode is in the form of a revolving cylinder so as to be also used as a printing roller for high speed transfer of the image reproduced onto paper or the like; such a cylinder must be of high precision and have a cylindrical surface virtually free of any defects, and is thus very costly. Moreover, since the negative electrodes are generally energized more than once in the reproduction of an image, these become polarized resulting in a gas generation and accumulation at the negative electrodes, which adversely affect the image reproduction.

SUMMARY OF THE INVENTION

It is therefore an object of the present invention to overcome the aforementioned drawbacks and to provide a method and apparatus for reproducing an image by electro-coagulation of a colloid and transferring the image thus reproduced onto an end-use support at high speed, which method and apparatus do not necessitate the use of high precision cylinders for coagulating the colloid and in which the electrode gap uniformity can be easily controlled.

It is another object of the invention to provide a method and apparatus of the above type, in which the image reproduction is not adversely affected by electrode polarization.

According to one aspect of the present invention, there is provided a method of reproducing an image and transferring same onto an end-use support, which comprises the steps of:

(a) providing a positive electrolytically inert electrode in the form of an endless elongated belt moving at substantially constant speed along a closed horizontal path and having an electrode active surface extending vertically, and a plurality of negative electrolytically inert electrodes electrically insulated from one another and arranged side-by-side in rectilinear alignment to define a series of corresponding electrode active surface disposed transversely of the belt and spaced from the positive electrode active surface thereof by a constant predetermined electrode gap;

(b) filling the electrode gap with a substantially liquid colloidal dispersion containing an electrolytically coagulable colloid, a liquid dispersing medium and a soluble electrolyte and having a substantially constant temperature;

(c) electrically energizing selected ones of the negative electrodes to cause point-by-point selective coagulation and adherence of the colloid onto the positive electrode active surface of the belt opposite the electrode active surfaces of the energized negative electrodes while the belt is moving, thereby forming a series of corresponding dots of coagulated colloid representative of a desired image (d) removing any remaining non-coagulated colloid from the positive electrode active surface;

(e) treating with a coloring agent the colloid either before or after the coagulation thereof in step (c) to obtain dots of colored, coagulated colloid; and (f) contacting the dots of colored, coagulated colloid with an end-use support to cause transfer of the coloring agent onto the end-use support and thereby imprint the end-use support with the image.

The present invention also provides, in a further aspect thereof, an apparatus for carrying out a method as defined above. The apparatus of the invention comprises a positive electrolytically inert electrode in the form of an endless elongated belt having an electrode active surface extending vertically, means for moving the endless elongated belt at substantially constant speed along a closed horizontal path, and a plurality of negative electrolytically inert electrodes electrically insulated from one another and arranged side-by-side in rectilinear alignment to define a series of corresponding electrode active surfaces disposed transversely of the belt and spaced from the positive electrode active surface thereof by a constant predetermined electrode gap. Means are provided for filling the electrode gap with a substantially liquid colloidal dispersion containing an electrolytically coagulable colloid, a liquid dispersing medium and a soluble electrolyte and having a substantially constant temperature, as well as means for electrically energizing selected ones of the negative electrodes to cause point-by-point selective coagulation and adherence of the colloid onto the positive electrode active surface of the belt opposite the electrode active surfaces of the energized negative electrodes while the belt is moving, thereby forming a series of corresponding dots of coagulated colloid representative of a desired image. The apparatus further includes means for removing any remaining non-coagulated colloid from the positive electrode active surface, means for treating with a coloring agent the colloid either before or after the coagulation thereof to obtain dots of colored, coagulated colloid, and means for bringing an end-use support into contact with the dots of colored, coagulated colloid to cause transfer of the coloring agent onto the end-use support and thereby imprint the end-use support with the image.

Thus, according to the invention, by using a positive electrode in the form of a moving endless belt onto which the colloid can be coagulated, high speed image reproduction and transfer can be achieved at substantially reduced cost as compared to using a revolving cylinder of high precision. The use of such an endless belt has also the advantage of enabling one to more easily control the uniformity of the electrode gap.

In a preferred embodiment of the invention, the endless elongated belt comprises a vertically disposed sheet material having at least a surface layer made of an electrolytically inert metal and defining the aforesaid positive electrode active surface. The sheet material is driven along the closed horizontal path by a drive roller located opposite the negative electrodes with the sheet material therebetween, the drive roller having a center axis extending substantially in alignment with the negative electrodes. This arrangement enables the colloidal dispersion to be continuously injected under pressure on the sheet material adjacent the electrode gap so as to press the sheet material against the drive roller and thereby maintain the aforesaid constant electrode gap. On the other hand, since the electrode gap is continuously supplied with fresh colloidal dispersion, gas bubbles generated as a result of electrode polarization are continuously removed by being entrained with the excess colloidal dispersion which is allowed to drain by gravity. In this manner, any gas accumulation that may hinder the image reproduction is prevented.

The surface layer of the sheet material which defines the positive electrode active surface must be made of a metal that will resist electrolytic attack and enhance electro-coagulation, such as stainless steel, platinum, chromium, nickel, aluminum or tin. The sheet material is preferably made entirely of such an electrolytically inert metal, but it can also be made of synthetic plastic material having a surface coating of electrolytically inert metal; it generally has a thickness of about 0.004 to about 0.010 inch. The negative electrodes are similarly made of an electrolytically inert metal, stainless steel being preferred. The positive electrode active surface is advantageously unpolished to enhance the adherence of the coagulated colloid thereon.

The colloid generally used is a linear colloid of high molecular weight, that is, one having a molecular weight comprised between about 10,000 and about 1,000,000, preferably between 100,000 and 600,000. Examples of suitable colloids include natural polymers such as albumin, gelatin, casein and agar, and synthetic polymers such as polyacrylic acid, polyacrylamide and polyvinyl alcohol. Water is preferably used as the medium for dispersing the colloid to provide the desired colloidal dispersion.

The colloidal dispersion also contains a soluble electrolyte which enables the water to have a greater conductivity. Examples of suitable electrolytes include chlorides and sulfates, such as lithium chloride, sodium chloride, potassium chloride, calcium chloride, nickel chloride, copper chloride, ammonium chloride and manganese sulfate. Since the speed of electrocoagulation is affected by temperature, the colloidal dispersion must be maintained at a substantially constant temperature in order to ensure a uniform image reproduction.

The selective energizing of the negative electrodes can be effected by sweeping such electrodes and transmitting electrical pulses to selected ones thereof during sweeping. These electrical pulses can be varied either in voltage or time from one electrode to another so as to correspondingly vary the amount of coagulated colloid adhered onto the positive electrode active surface. This enables one to form dots of varying intensities and thus to reproduce the half-tones of an image.

After coagulation of the colloid, any remaining non-coagulated colloid is removed from the positive electrode active surface, for instance by scraping the surface with a soft rubber squeegee, so as to fully uncover the coagulated colloid.

In order to provide a monochromic or polychromic image, the dots of coagulated colloid obtained in step (c) of the method according to the invention must be colored with a coloring agent and the coloring of the colloid is effected either before or after the coagulation thereof in step (c) depending on whether the coloring agent used is a pigment or a dye. Where the coloring agent is a pigment, the coloring of the colloid is effected prior to coagulation by admixing the pigment with the colloidal dispersion so as to obtain upon the coagulation of the colloid in step (c) the desired dots of colored, coagulated colloid. These are treated after removal of any non-coagulated colloid with a colloid softening agent so as to maintain the colored, coagulated colloid in a softened state for enabling the pigment to be subsequently transferred onto the end-use support in step (f). Examples of suitable colloid softening agents include glycerol, ethylene glycol, sorbitol and formamide.

On the other hand, in the case where the coloring agent is a dye, the coloring of the colloid is effected after coagulation by applying to the dots of coagulated colloid obtained in step (c), after removal of any non-coagulated colloid, a liquid coloring medium containing the dye and having substantially the same constant temperature as the colloidal dispersion, thereby obtaining the desired dots of colored, coagulated colloid. In this case, the end-use support utilized in step (f) must be coated with a wetting agent which is a solvent of the dye for enabling the dye to be transferred onto the end-use support. The end-use support can be gelatinized paper or any ordinary paper, including uncoated paper such as bond paper and coated paper such as synthetic resin-coated or kaolin-coated paper. If gelatinized paper is used, the wetting agent must also act as a gelatin softening agent for conditioning the gelatinized paper to receive the dye; examples of suitable wetting and gelatin softening agents are water and aqueous solutions of acetic or citric acid, or an alkali metal salt thereof such as sodium acetate. If bond paper or synthetic resin-coated or kaolin-coated paper or the like is used, the coloring medium must further contain a colloid softening agent so as to maintain the colored, coagulated colloid in a softened state and thus allow transfer of the dye onto such type of end-use support. The colloid softening agent is preferably glycerol, ethylene glycol, sorbitol or formamide, whereas the wetting agent used for coating the end-use support is preferably methanol, ethanol, isopropanol, acetone or formaldehyde. Preferred combinations of electrolytically coagulable colloid and coloring medium therefor are ones in which the colloid is polyacrylic acid or polyacrylamide and the coloring medium comprises an aqueous solution containing a water-soluble dye and a colloid softening agent selected from the group consisting of glycerol, ethylene glycol and formamide.

The liquid coloring medium is advantageously applied transversely of the belt by means of a shower or horizontal spray of the coloring medium, excess coloring medium being allowed to drain off the belt by gravity so as to be collected for recycling after removal of residual non-coagulated colloid entrained with the coloring medium.

Where a polychromic image is desired, steps (a) through (f) of the above-described method are repeated several times to define a corresponding number of printing stages each using a coloring agent of different color and to thereby produce several differently colored images of coagulated colloid which are transferred onto the end-use support in superimposed relation to provide the desired polychromic image.

The printing method and apparatus according to the invention enables to produce per print of $8\frac{1}{2}\times 11$ inch about 4,000,000 dots of colored, coagulated colloid of varying intensities per color with a resolution of about 40,000 dots per square inch and to provide a printed copy at a rate of one copy every second, with either a monochromic or polychromic image.

BRIEF DESCRIPTION OF THE DRAWINGS

Further features and advantages of the invention will become more readily apparent from the following description of preferred embodiments thereof as illustrated by way of examples in the accompanying drawings, in which.

DESCRIPTION OF PREFERRED EMBODIMENTS

Figure 1:
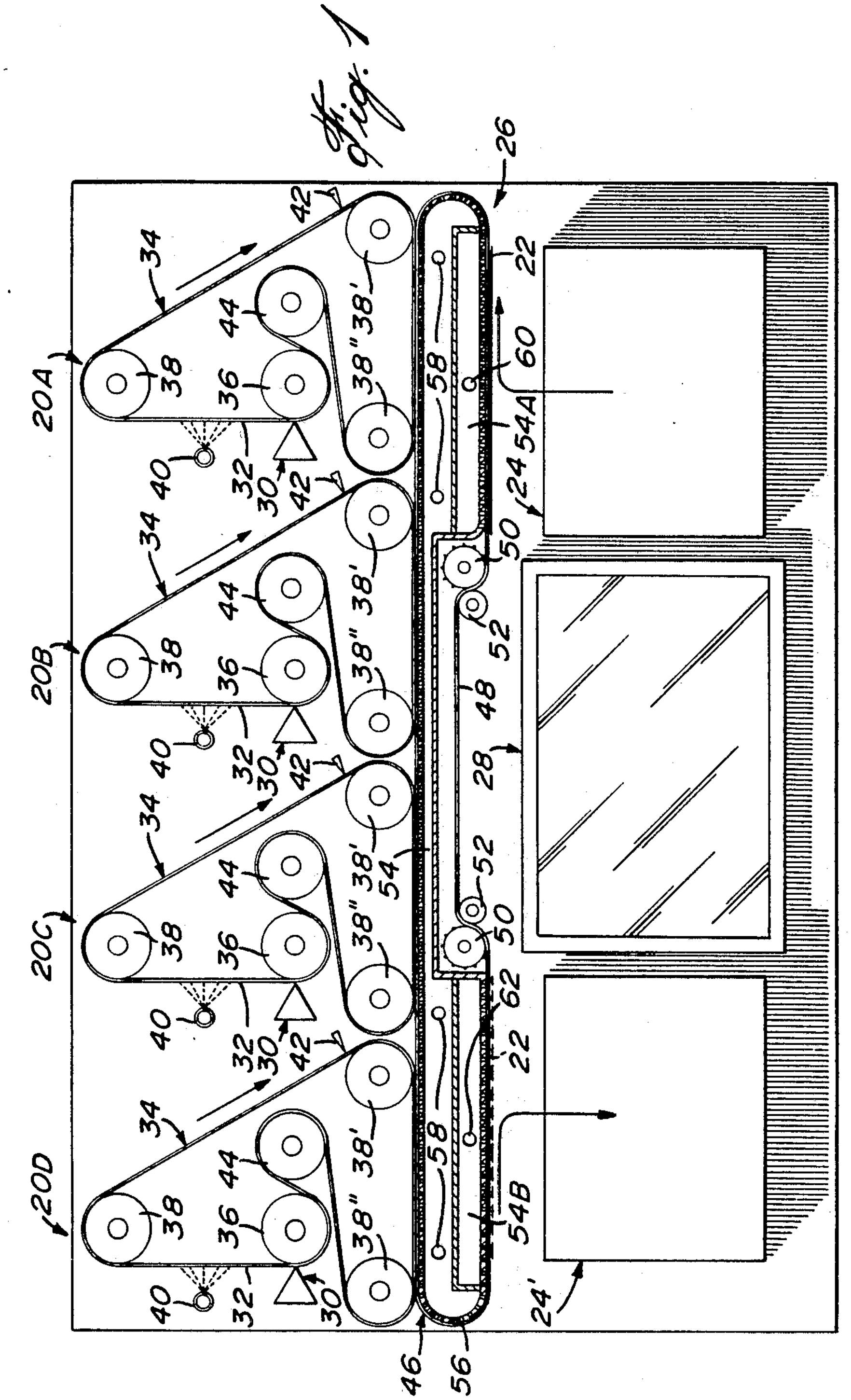
FIG. 1 is a schematic top view of a printing apparatus according to a preferred embodiment of the invention, comprising four printing units each using a coloring agent of different color.

Referring first to FIG. 1, there is illustrated a printing apparatus comprising four indentical printing units 20 arranged in tandem relation, but each using a coloring agent of different color. In the embodiment shown, the first printing unit 20A at the right of the figure is adapted to print in black color, the second printing unit 20B in cyan color, the third printing unit 20C in magenta color and the fourth printing unit 20D in yellow color. Individual sheets of paper 22 are fed from a stack 24 by a feeder mechanism (not shown) and transported to the printing units 20 by means of a conveyor system generally designated by reference numeral 26. The sheets once imprinted with a desired image are discharged from the apparatus and pile up to form another stack 24'. A scanner 28 is provided for scanning the image to be reproduced.

Each printing unit 20 comprises a printing head 30 adapted to produce on the surface 32 of a positive electrode 34 in the form of an endless belt dots of coagulated colloid of varying intensities representative of the desired image. The belt 34 is disposed with its surface 32 extending vertically and is displaced along a closed horizontal path in the direction shown by the arrow by means of a vertically disposed drive roller 36 and three vertically disposed guide rollers 38,38' and 38" which are idler or tension drive rollers. A horizontal spray system 40 is provided for applying a liquid coloring medium transversely of the belt 34 to color the dots of coagulated colloid, excess liquid coloring medium being removed from the belt 34 by a soft rubber squeegee 42. The dots of colored, coagulated colloid on the surface 32 of the belt 34 are then pressed into contact with a sheet of paper 22 conveyed by the conveyor system 26, by means of the roller 38', thereby causing transfer of the coloring agent onto the paper and imprint of the latter with the desired image. A roller 44 with an abrasive surface is provided to remove any remaining coagulated colloid from the surface 32 of the belt 34 and to thus clean the surface 32 prior to passing by the printing head 30 once again.

Figure 12:
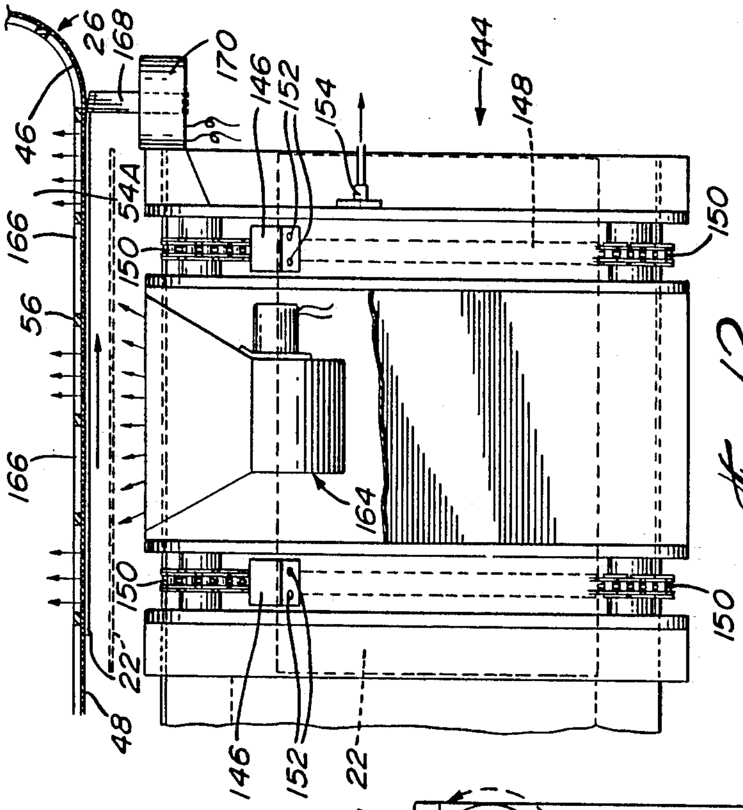
FIG. 12 is a part sectional top view of the paper feeder mechanism shown in FIG. 11.
Figure 11:
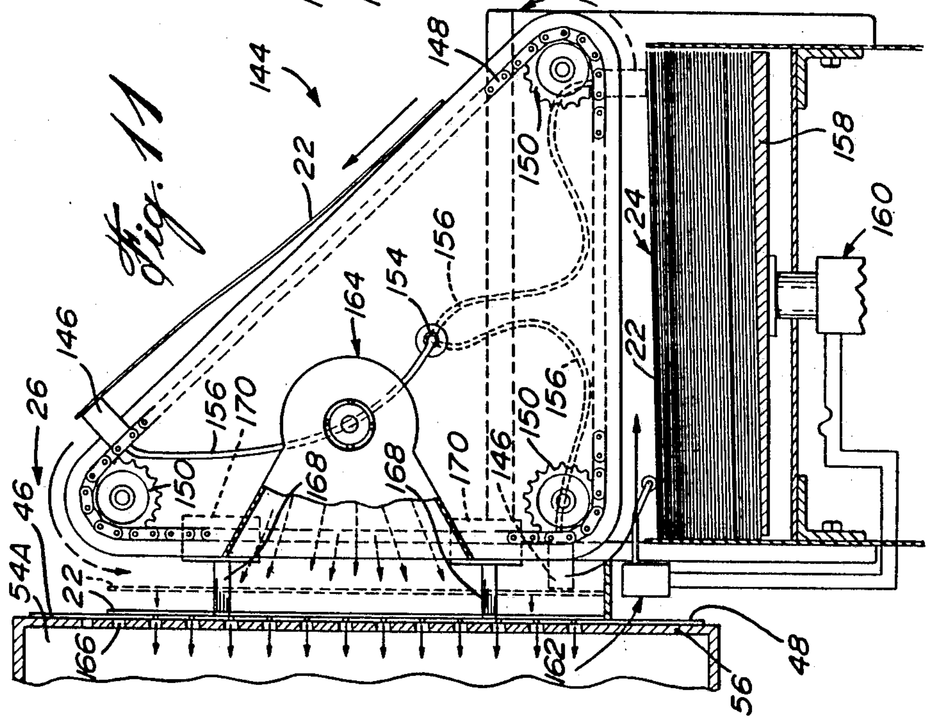
FIG. 11 is a fragmentary part-sectional elevation view showing the paper feeder mechanism used for feeding individual sheets of paper to the printing apparatus.

As shown, the conveyor system 26 comprises an endless conveyor belt 46 adapted to convey individual sheets of paper into position for being successively imprinted with the colored images by the printing units 20A, 20B, 20C and 20D. The conveyor belt 46 is moved with its transport surface 48 extending vertically along a closed horizontal by the drive rollers 50 while being maintained under tension by means of the tension rollers 52. It is displaced about an evacuated chamber 54 having a perforated vertically extending wall 56, in frictional moving engagement with the perforated wall 56. The belt 46 is also perforated to permit the sheets of paper 22 to adhere by suction to the transport surface 48. The chamber 54 which is maintained under permanent vacuum via the holes 58 includes two separate compartments 54A and 54B in which the vacuum is controlled independently of the chamber 54 via the holes 60 and 62, respectively. The compartment 54A is evacuated only when the paper feeder mechanism which is shown in FIGS. 11 and 12 is actuated so as to assist in the transfer of a sheet of paper 22 from the stack 24 onto the transport surface 48 of the conveyor belt 46. In the compartment 54B, on the other hand, the vacuum is replaced by air pressure when the sheet of paper 22 once imprinted arrives at the position shown in broken lines so as to eject such a sheet from the belt 46, the sheet thus ejected being guided by conventional guide means (not shown) to pile up on the stack 24'.

Figures 2, 3:
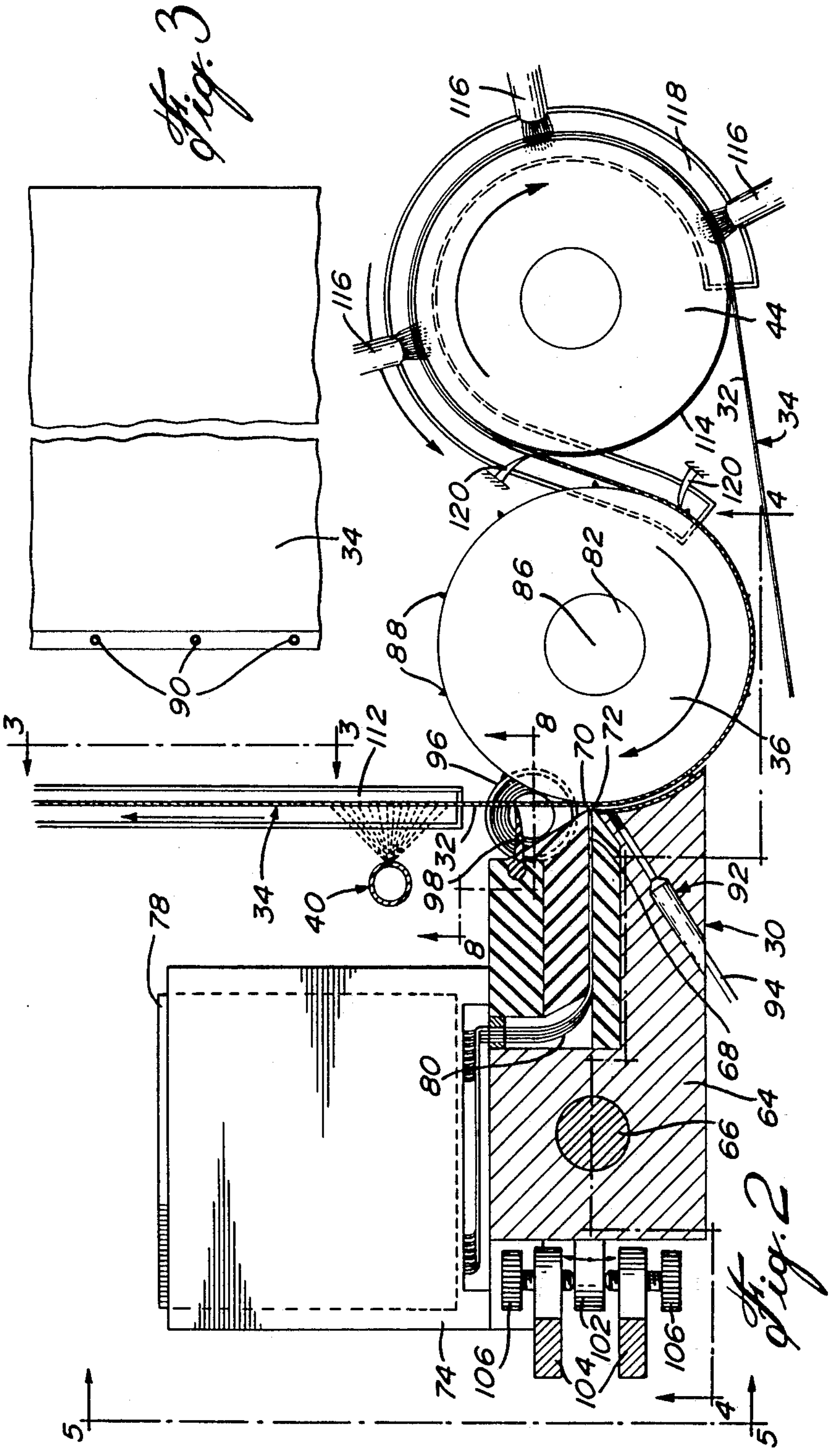
FIG. 2 is a fragmentary part-sectional view of a printing unit showing details of the printing head.
FIG. 3 is a fragmentary view taken along line 3—3 of FIG. 2, showing the positive electrode in the form of a belt.
Figure 5:
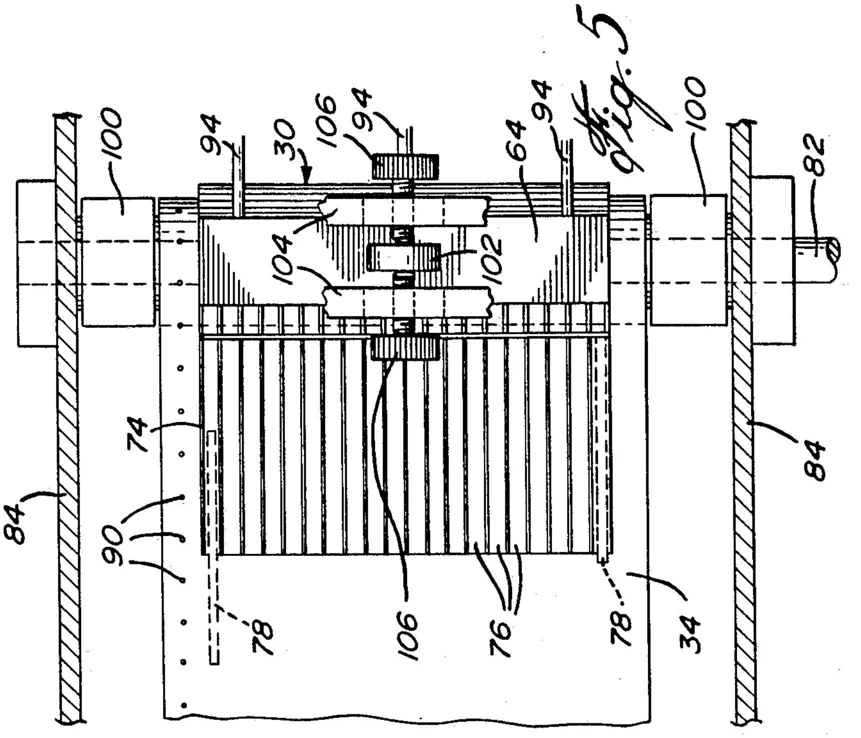
FIG. 5 is a fragmentary view taken along line 5—5 of FIG. 2.
Figure 4:
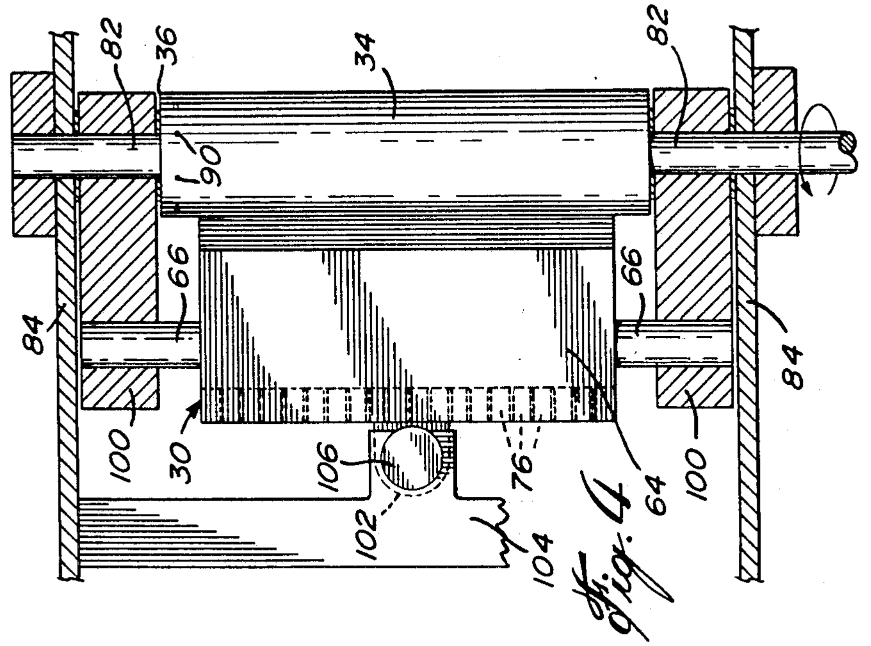
FIG. 4 is a fragmentary part-sectional view taken along line 4—4 of FIG. 2.
Figure 6:
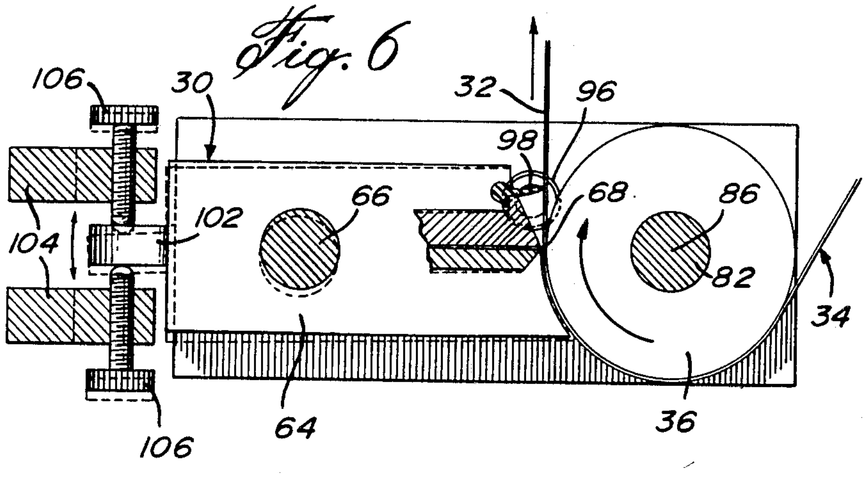
FIG. 6 is a fragmentary part-sectional top view showing how the printing head can be adjusted to permit registration of the colored images produced by the printing units.
Figure 7:
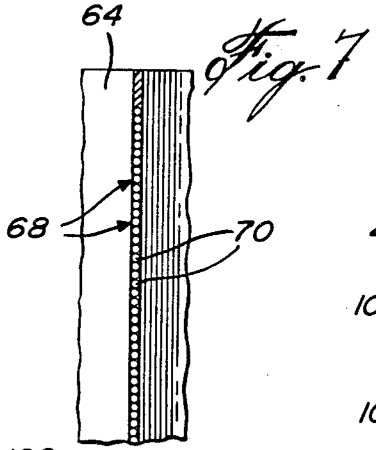
FIG. 7 is a fragmentary elevation view of the negative electrodes arranged in rectilinear alignment.

Turning to FIGS. 2–8 and more particularly to FIGS. 2, 4 and 5, the printing head 30 of each printing unit 20 comprises a body 64 secured to a vertically extending support rod 66 and provided with a plurality of negative electrodes 68. The negative electrodes 68 are electrically insulated from one another and arranged side-by-side in rectilinear alignment, as best shown in FIG. 7; these define a series of corresponding negative electrode active surfaces 70 which are disposed transversely of the belt 34 and spaced from the positive electrode active surface 32 thereof by a constant electrode gap 72 of the order of 50$\mu$. The printing head 30 further includes a multi-socket member 74 provided with a plurality of sockets 76 for receiving and electrically connecting integrated circuit boards 78 to the negative electrodes 68 via the electrical wires 80. The integrated circuit boards 78 serve to control the selective energizing of the electrodes 68 and are operative to transmit to the latter electrical pulses which are modulated in voltage or time.

The drive roller 36 used to move the belt 34 along a closed horizontal path is fixedly connected to a shaft 82 which is rotatably mounted to the frame 84 and driven at substantially constant speed by a motor (not shown) for rotation of the roller 36 about the center axis 86 in the direction shown by the arrow in FIG. 2. In order to transmit the desired movement to the belt 34, the roller 36 is provided adjacent its upper end with a plurality of radially spaced-apart teeth 88 engaging in corresponding holes 90 formed in the belt 34 and spaced along the upper longitudinal edge thereof, as best shown in FIGS. 3 and 5. The drive roller 36 is located opposite the negative electrodes 68 with the belt 34 therebetween, the center axis 86 of the roller 36 extending substantially in alignment with the electrodes 68.

As shown in FIGS. 2 and 5, the body 64 of the printing head 30 is formed with three injection nozzles 92 for continuously injecting under pressure the necessary liquid colloidal dispersion onto the surface 32 of the belt 34 transversely thereof and adjacent the electrode gap 72 so as to press the belt 34 against the drive roller 36 and thereby maintain the required constant gap, the colloidal dispersion being fed to the nozzles 92 via the conduits 94. In this manner, the electrode gap 72 is continuously supplied with fresh colloidal dispersion and thus any gas bubbles generated as a result of electrode polarization are removed by being entrained with the excess colloidal dispersion which is allowed to drain off the surface 32 into the drain pipe 96. After electrocoagulation of the colloid contained in the colloidal dispersion and formation of the dots of coagulated colloid representative of a desired image on the surface 32 of the belt 34 opposite the electrode active surfaces 70 of the energized negative electrodes 68, any remaining non-coagulated colloid is removed from the surface 32 by means of a soft rubber squeegee 98 and combined with the excess colloidal dispersion drained off the belt 34 by gravity and flowing into the drain pipe 96, so as to be collected and recirculated together with the excess colloidal dispersion back to the injection nozzles 92.

In order to permit registration of the images produced by the respective printing heads 30 of the printing units 20, the vertical rod 66 to which the body 64 of each printing head is secured is fixedly mounted to upper and lower members 100 which are pivotally connected to the drive shaft 82 and the body 64 is provided with a projection 102 extending between two T-shaped bars 104 fixed to the frame 84 and each carrying a screw member 106 so that the position of the negative electrodes 68 can be adjusted relative to the center axis 86 of the drive roller 36. Fine adjustment of the screw members 106 causes the members 100 carrying the body 64 to slightly pivot about the shaft 82 and thus the body 64 to pivotally move with the negative electrodes 68 being displaced relative to the center axis 86 of the roller 36, as best shown in FIG. 6.

Figure 8:
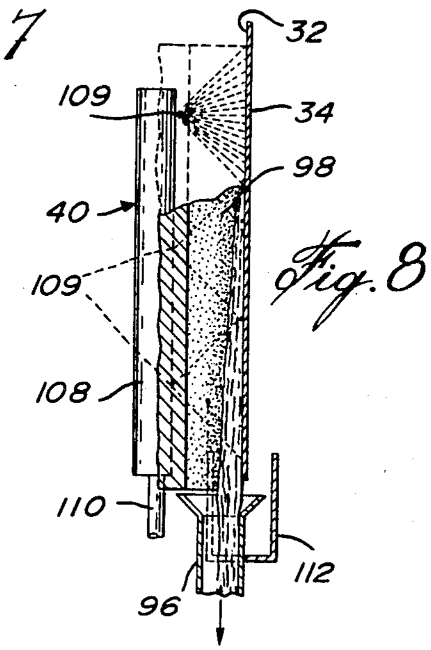
FIG. 8 is a fragmentary part-sectional view taken along line 8—8 of FIG. 2.

The dots of coagulated colloid produced on the surface 32 of the belt 34 are colored by means of the horizontal spray system 40 which is adapted to apply a liquid coloring medium transversely of the belt 34, when use is made of a dye as coloring agent. As shown in FIG. 8, the spray system 40 comprises a vertical tube 108 provided along the length thereof with a plurality of spaced-apart spray apertures 109 for directing a spray of liquid coloring medium onto the surface 32, the liquid coloring medium being fed via the conduit 110. Excess coloring medium is allowed to drain off the belt 34 by gravity and is collected in the trough 112 for recycling after removal of residual non-coagulated colloid entrained with the coloring medium, for instance by ultrafiltration or chemical precipitation. Examples of suitable dyes which may be used to color the coagulated colloid with the spray system 40 after electrocoagulation are the water soluble dyes available from HOECHST such as Duasyn Acid Black for use in the black printing unit 20A and Duasyn Acid Blue for use in the cyan printing unit 20B, or those available from RIEDEL-DEHAEN such Anti-Halo Dye Blue T. Pina for use in the cyan printing unit 20B, Anti-Halo Dye AC Magenta Extra V01 Pina for use in the magenta printing unit 20C and Anti-Halo Dye Oxonol Yellow N. Pina for use in the yellow printing unit 20D.

On the other hand, where use is made of a pigment as coloring agent, the coloring of the colloid is effected prior to electro-coagulation by admixing the pigment with the liquid colloidal dispersion injected through the nozzles 92 so as to obtain upon coagulation of the colloid dots of colored, coagulated colloid. In this case, the horizontal spray system 40 is of course not used to apply liquid coloring medium, but rather serves to apply a colloid softening agent such as glycerol, ethylene glycol, sorbitol or formamide in order to maintain the colored, coagulated colloid in a softened state and thus enable the pigment to be subsequently transferred onto the paper 22 conveyed by the conveyor belt 46, excess colloid softening agent being removed from the surface 32 of the belt 34 by the squeegee 42 shown in FIG. 1. Examples of suitable pigments are those available from HOECHST such as Colanyl or Flexonyl Black for use in the black printing unit 20A, Colanyl or Flexonyl Blue for use in the cyan printing unit 20B, Colanyl or Flexonyl Violet for use in the magenta printing unit 20C and Colanyl or Flexonyl Yellow for use in the yellow printing unit 20D.

After transfer of the coloring agent contained in the dots of colored, coagulated colloid adhered to the surface 32 of the belt 34 onto the paper 22 by means of the roller 38' shown in FIG. 1, the belt 34 passes around the abrasive roller 44 which rotates in a direction opposite to the direction of rotation of the drive roller 36 for increasing the frictional engagement of the abrasive surface 114 of the roller 44 with the surface 32, as best shown in FIG. 2. In this manner, any remaining coagulated colloid is removed from the surface 32 which is thus cleaned prior to passing through the electrode gap 72 once again. The belt 34 is also continuously washed with a washing liquid such as water applied transversely of the belt by means of the shower elements 116, the washing liquid entraining particles of coagulated colloid removed by the abrasive roller 44 as it drains off the belt 34 by gravity to collect in the trough 118 for recycling. Excess washing liquid is removed by the pair of squeegees 120.

Figure 9:
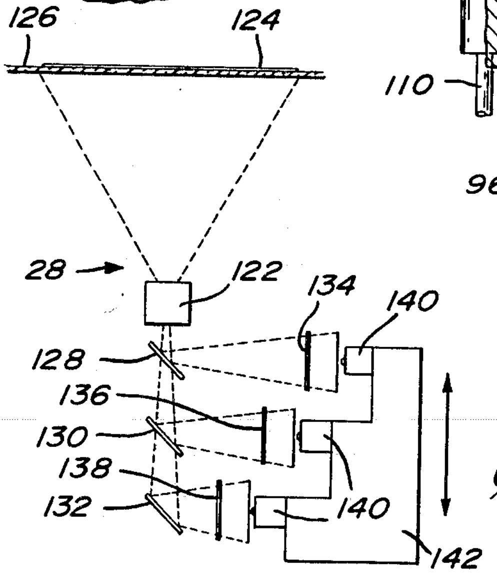
FIG. 9 is a schematic view of the scanner system used for scanning the image to be reproduced.

FIG. 9 schematically illustrates the scanner system 28 used for scanning the image to be reproduced. As shown, the scanner 28 comprises a multi-element optical lens 122 for reading the document 124 placed on the transparent window 126 and of which the image is to be reproduced. The beam of light issuing from the lens 122 is divided into three components of equal light intensity by the mirrors 128, 130 and 132, the mirrors 128 and 130 being partially reflecting mirrors and the mirror 132 being a totally reflecting mirror. The mirror 128 is adapted to reflect $33\frac{1}{3}\%$ of the light intensity onto the red filter 134 to provide a red-filtered image of reduced dimensions while allowing the remainder of the light intensity, i.e. $66\frac{2}{3}\%$, to pass through for being reflected by the mirror 130. The mirror 130 in turn reflects 50% of the incoming light intensity onto the green filter 136 to provide a green-filtered image of reduced dimensions while allowing the remainder of the light intensity, i.e. $33\frac{1}{3}\%$, to pass through for being totally reflected by the mirror 132 onto the blue filter 138 to provide a blue-filtered image of reduced dimensions. The red, green and blue-filtered images of reduced dimensions thus produced are sensed by respective linear image sensors 140 fixed to a common support 142. Each image sensor 140 typically comprises 1728 CCD (charge coupled device) elements which transform light into an electrical charge and provide a 200-points-perinch resolution across 8.5 inches. As an example of such an image sensor, use can be made of the TC 101 line image sensor available from TEXAS INSTRUMENTS INC. The support 142 is displaced back and forth in the direction of the arrow to provide a mechanical scanning of the color-filtered images by the image sensors 140 which in turn electronically scan the images in a direction normal to the direction of mechanical scanning. Each of the three image snesors 140 will thus deliver a signal of information for printing a fundamental color image by each of the independent printing units 20, the image sensors associated respectively with the red, green and blue filters 134, 136 and 138 delivering signals of information for printing respectively in the cyan, magenta and yellow colors.

Figure 10:
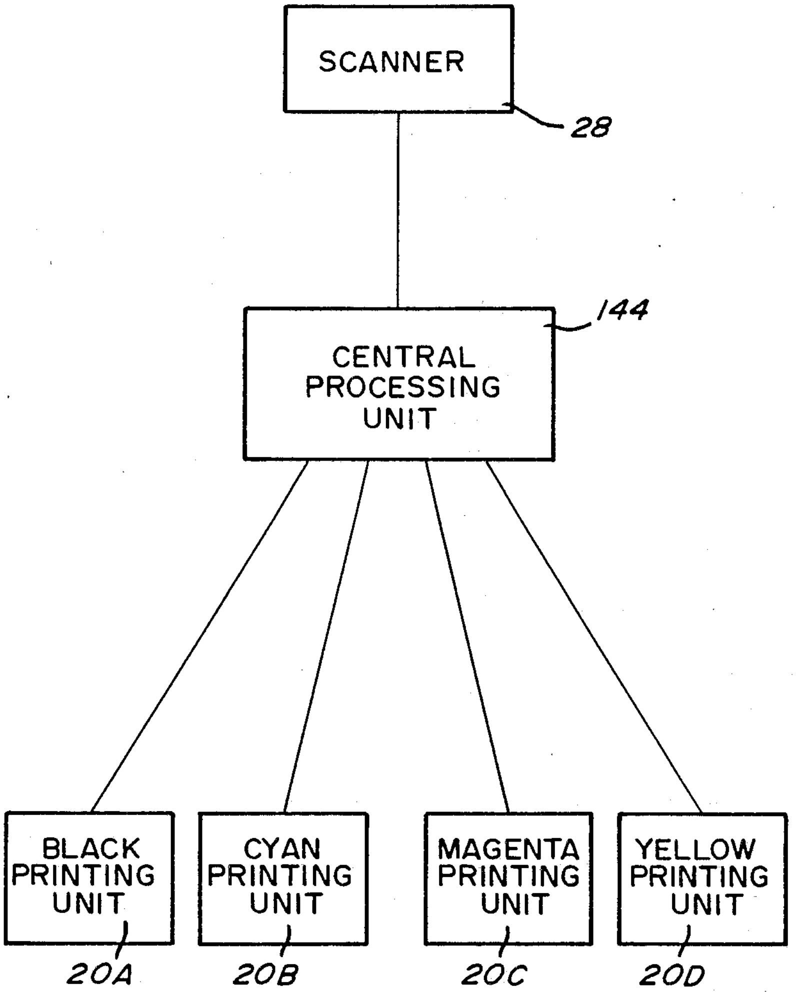
FIG. 10 is a schematic diagram showing how the signals of information provided by the scanner are processed.

As shown in FIG. 10, the signals of information delivered by the three image sensors 140 of the scanner 28 are fed to a central processing unit 142 which is connected to the printing heads 30 of the black, cyan, magenta and yellow printing units 20A, 20B, 20C and 20D. The central processing unit 142 determines a composite signal corresponding to the lowest common signal delivered by the three image sensors 140, which composite signal provides the information for printing in black by the black printing unit 20A. All four signals of information for printing respectively in black, cyan, magneta and yellow are amplified prior to being transmitted respectively to the black, cyan, magenta and yellow printing units 20A, 20B, 20C and 20D for activating the printing heads 30 thereof. The central processing unit can also be fed with signals of information originating from different sources, such as digital computers, modem phone lines and televideo equipment; the scanner 28 is of course deactivated for these applications.

Turning to FIGS. 11 and 12 which illustrate the paper feeder mechanism utilized for feeding individual sheets of paper 22 from the stack 24 to the conveyor system 26, such a paper feeder mechanism which is generally designated by reference numeral 144 is seen to comprise two movable suction members 146 each fixedly connected to a chain 148 which itself is driven along a triangular path by sprocket wheels 150 at the corners of the triangle. Each suction member 146 is provided with suction holes 152 for adhering by suction a sheet 22 and is connected to a vacuum outlet 154 by means of a flexible conduit 156. As shown, the suction members 146 are operative to pick up the uppermost sheet of the paper stack 24 supported at a slight angle by the platform 158 and maintained at a constant level by means of the lifter 160 coupled to a level sensing device 162, and to transport the sheet thus picked up to a transfer position represented in broken lines whereat the sheet is positioned adjacent the conveyor belt 46 of the conveyor system 26 and faces the transport surface 48 of the latter. A blower 164 is also provided for applying air pressure against the sheet 22 at the transfer position so as to displace same onto the transport surface 48. At the same time as the blower 164 is activated, the compartment 54A is evacuated in order to assist in displacing the sheet 22 on the conveyor belt 46 which is perforated and in continuous frictional moving engagement with the wall 56 provided with perforations 166, and also cause the sheet 22 to adhere by suction to the transport surface 48. The sheet 22 is retained in stationary position on the continuously moving belt 46 in frictional sliding engagement therewith by means of two vertically spaced retractable stop members 168 which are retracted by the solenoid-type devices 170 when order is received to release the sheet.

The printing apparatus described above can print a monochromic or polychromic image and can be operated in either monomode to print an image on a single copy or in multimode to print the same image on several copies. Thus, when it is desired to print in monomode a monochromic image, a single sheet of paper 22 is fed to the black printing unit 20A which is activated to print in black whereas the cyan, magenta and yellow printing unit 20B, 20C and 20D are inactive to print; in multimode, several sheets of paper 22 are fed one at a time to the black printing unit 20A which then functions nonstop until all the desired copies are printed. On the other hand, when a polychromic image is desired, all printing units 20A, 20B, 20C and 20D are operative to print.

Figure 13:
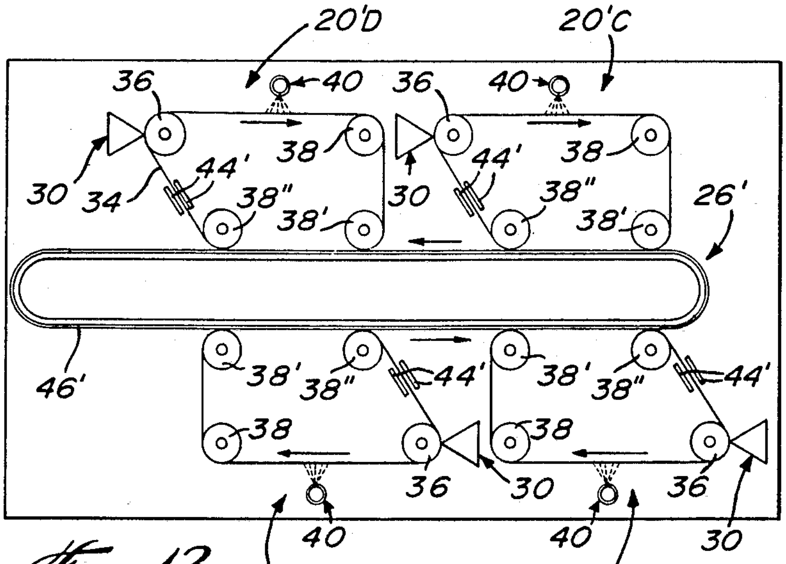
FIG. 13 is a schematic top view of a printing apparatus according to another preferred embodiment of the invention, showing a different arrangement of the printing units.
Figure 14:
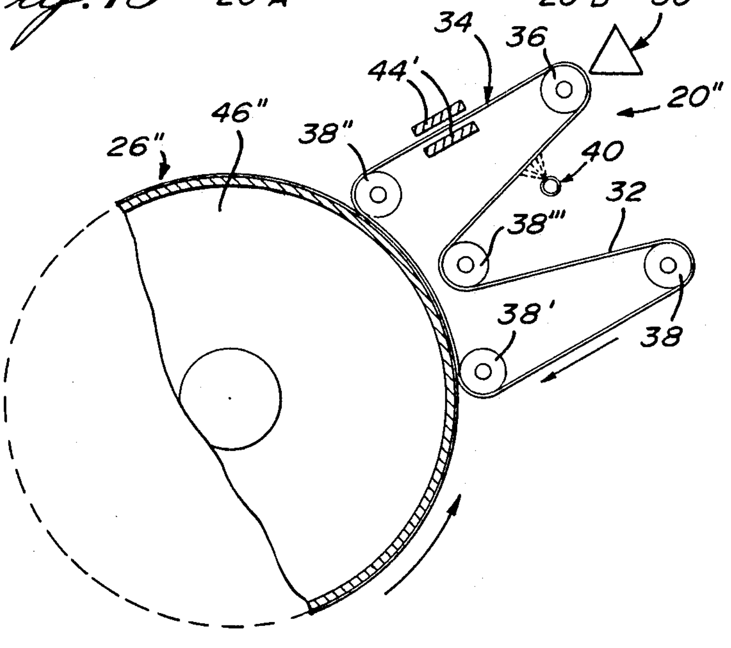
FIG. 14 is a view similar to FIG. 13 but showing in part a further preferred embodiment of the invention.

FIGS. 13 and 14 illustrate alternative embodiments. As shown in FIG. 13, the path defined by the conveyor belt 46' of the paper conveyor system 26' includes a pair of parallel rectilinear portions and the printing units 20' are arranged along both recti

I claim:

1. A method of reproducing an image and transferring same onto an end-use support, which comprises the steps of:

(a) providing a positive electrolytically inert electrode in the form of an endless elongated belt moving at substantially constant speed along a closed horizontal path and having an electrode active surface extending vertically, and a plurality of negative electrolytically inert electrodes electrically insulated from one another and arranged side-by-side in rectilinear alignment to define a series of corresponding electrode active surfaces disposed transversely of said belt and spaced from the positive electrode active surface thereof by a constant predetermined electrode gap;

(b) filling said electrode gap with a substantially liquid colloidal dispersion containing an electrolytically coagulable colloid, a liquid dispersing medium and a soluble electrolyte and having a substantially constant temperature;

(c) electrically energizing selected ones of said negative electrodes to cause point-by-point selective coagulation and adherence of the colloid onto the positive electrode active surface of said belt opposite the electrode active surfaces of said energized negative electrodes while said belt is moving, thereby forming a series of corresponding dots of coagulated colloid representative of a desired image;

(d) removing any remaining non-coagulated colloid from said positive electrode active surface;

(e) treating with a coloring agent the colloid either before or after the coagulation thereof in step (c) to obtain dots of colored coagulated colloid; and (f) contacting the dots of colored, coagulated colloid with an end-use support to cause transfer of said coloring agent onto said end-use support and thereby imprint said end-use support with said image.

2. A method as claimed in claim 1, wherein said endless elongated belt comprises a vertically disposed sheet material having at least a surface layer made of an electrolytically inert metal and defining said positive electrode active surface, said sheet material being driven along said closed horizontal path by a drive roller located opposite said negative electrodes with said sheet material therebetween, said drive roller having a center axis extending substantially in alignment with said negative electrodes.

3. A method as claimed in claim 2, wherein said sheet material is made entirely of an electrolytically inert metal selected from the group consisting of stainless steel, platinum, chromium, nickel, aluminum and tin.

4. A method as claimed in claim 3, wherein said sheet metal has a thickness of about 0.004 to about 0.010 inch.

5. A method as claimed in claim 2, wherein said colloidal dispersion is continuously injected under pressure on said sheet material adjacent said electrode gap so as to press said sheet material against said drive roller and thereby maintain said constant electrode gap while continuously supplying said electrode gap with fresh colloidal dispersion to remove gas bubbles generated as a result of electrode polarization.

6. A method as claimed in claim 1, wherein said colloid is a linear colloid having a molecular weight of about 10,000 to about 1,000,000.

7. A method as claimed in claim 6, wherein said colloid has a molecular weight ranging from about 100,000 to about 600,000.

8. A method as claimed in claim 6, wherein said colloid is a natural polymer selected from the group consisting of albumin, gelatin, casein and agar.

9. A method as claimed in claim 6, wherein said colloid is a synthetic polymer selected from the group consisting of polyacrylic acid, polyacrylamide and polyvinyl alcohol.

10. A method as claimed in claim 1, wherein said dispersing medium is water and said electrolyte is selected from the group consisting of lithium chloride, sodium chloride, potassium chloride, calcium chloride, nickel chloride, copper chloride, ammonium chloride and manganese sulfate.

11. A method as claimed in claim 1, wherein said coloring agent is a pigment and step (e) is carried out by admixing said pigment with said colloidal dispersion to obtain upon coagulation of the colloid in step (c) said dots of colored, coagulated colloid, which are thereafter treated with a colloid softening agent so as to maintain the colored, coagulated colloid in a softened state for enabling said pigment to be transferred onto said end-use support in step (f).

12. A method as claimed in claim 11, wherein said softening agent is selected from the group consisting of glycerol, ethylene glycol, sorbitol and formamide.

13. A method as claimed in claim 1, wherein said coloring agent is a dye and step (e) is carried out by applying to the dots of coagulated colloid obtained in step (c) a liquid coloring medium containing said dye and having substantially the same constant temperature as said colloidal dispersion, thereby obtaining said dots of colored, coagulated colloid, and wherein the end-use support utilized in step (f) is coated with a wetting agent which is a solvent of said dye for enabling said dye to be transferred onto said end-use support.

14. A method as claimed in claim 13, wherein said end-use support is gelatinized paper and said wetting agent further acts as a gelatin softening agent for conditioning said gelatinized paper to receive said dye.

15. A method as claimed in claim 14, wherein said wetting and softening agent is selected from the group consisting of water and aqueous solutions of acetic or citric acid, or an alkali metal salt thereof.

16. A method as claimed in claim 13, wherein said coloring medium further contains a colloid softening agent for maintaining the colored, coagulated colloid in a softened state.

17. A method as claimed in claim 16, wherein said softening agent is selected from the group consisting of glycerol, ethylene glycol, sorbitol and formamide.

18. A method as claimed in claim 16, wherein said wetting agent is selected from the group consisting of methanol, ethanol, isopropanol, acetone and formaldehyde.

19. A method as claimed in claim 16, wherein said end-use support is bond paper or a synthetic resin-coated or kaolin-coated paper.

20. A method as claimed in claim 16, wherein said colloid is polyacrylic acid and said coloring medium comprises an aqueous solution containing a water-soluble dye and a colloid softening agent selected from the group consisting of glycerol, ethylene glycol and formamide.

21. A method as claimed in claim 16, wherein said colloid is polyacrylamide and said coloring medium comprises an aqueous solution containing a water-soluble dye and a colloid softening agent selected from the group consisting of glycerol, ethylene glycol and formamide.

22. A method as claimed in claim 13, wherein said liquid coloring medium is applied transversely of said belt by means of a shower or horizontal spray of said coloring medium, excess coloring medium being allowed to drain off said belt by gravity and being collected for recycling after removal of residual non-coagulated colloid entrained with said coloring medium.

23. A method as claimed in claim 1, further including the step of removing after step (f) any remaining coagulated colloid from said positive electrode active surface.

24. A method as claimed in claim 1, wherein steps (a) through (f) are repeated several times to define a corresponding number of printing stages each using a coloring agent of different color and to thereby produce several differently colored images of coagulated colloid which are transferred onto said end-use support in superimposed relation to provide a polychromic image.

25. A method as claimed in claim 24, wherein said end-use support is in the form of individual sheets and respective ones of said sheets are brought into position for being successively imprinted with said colored images at said printing stages.

26. A method as claimed in claim 25, wherein said sheets are individually conveyed to each printing stage by means of an endless conveyor belt moving along a closed horizontal path and having a vertically disposed transport surface.

27. A method as claimed in claim 26, wherein the path defined by said conveyor belt includes a rectilinear portion and said printing stages are arranged in tandem relation along said rectilinear path portion.

28. A method as claimed in claim 26, wherein the path defined by said conveyor belt includes a pair of parallel rectilinear portions and said printing stages are arranged along both said rectilinear path portions.

29. A method as claimed in claim 25, wherein said sheets are individually conveyed to each printing stage by means of a vertically disposed conveyor roller and said printing stages are arranged radially around said conveyor roller.

30. An apparatus for reproducing an image and transferring same onto an end-use support, which comprises:

a positive electrolytically inert electrode in the form of an endless elongated belt having an electrode active surface extending vertically;

means for moving said endless elongated belt at substantially constant speed along a closed horizontal path;

a plurality of negative electrolytically inert electrodes electrically insulated from one another and arranged side-by-side in rectilinear alignment to define a series of corresponding electrode active surfaces disposed transversely of said belt and spaced from the positive electrode active surface thereof by a constant predetermined electrode gap;

means for filling said electrode gap with a substantially liquid colloidal dispersion containing an electrolytically coagulable colloid, a liquid dispersing medium and a soluble electrolyte and having a substantially constant temperature;

means for electrically energizing selected ones of said negative electrodes to cause point-by-point selective coagulation and adherence of the colloid onto the positive electrode active surface of said belt opposite the electrode active surfaces of said energized negative electrodes while said belt is moving, thereby forming a series of corresponding dots of coagulated colloid representative of a desired image;

means for removing any remaining non-coagulated colloid from said positive electrode active surface;

means for treating with a coloring agent the colloid either before or after the coagulation thereof to obtain dots of colored, coagulated colloid; and means for bringing an end-use support into contact with the dots of colored, coagulated colloid, to cause transfer of said coloring agent onto said end-use support and thereby imprint said end-use support with said image.

31. An apparatus as claimed in claim 30, wherein said electrode gap is of the order of 50μ.

32. An apparatus as claimed in claim 30, wherein said endless elongated belt comprises a vertically disposed sheet material having at least a surface layer made of an electrolytically inert metal and defining said positive electrode active surface, and wherein said means for moving said sheet material along said closed horizontal path include a drive roller located opposite said negative electrodes with said sheet material therebetween, said drive roller having a center axis extending substantially in alignment with said negative electrodes.

33. An apparatus as claimed in claim 32, wherein said sheet material is made entirely of an electrolytically inert metal selected from the group consisting of stainless steel, platinum, chromium, nickel, aluminum and tin.

34. An apparatus as claimed in claim 33, wherein said sheet metal has a thickness of about 0.004 to about 0.010 inch.

35. An apparatus as claimed in claim 32, further including means for adjusting the position of the negative electrodes relative to the center axis of said drive cylinder.

36. An apparatus as claimed in claim 32, wherein said filling means include nozzle means for continuously injecting under pressure said colloidal dispersion on said sheet material adjacent said electrode gap so as to press said sheet material against said drive roller and thereby maintain said constant electrode gap while supplying said electrode gap with fresh colloidal dispersion to remove gas bubbles generated as a result of electrode polarization.

37. An apparatus as claimed in claim 36, further including means for collecting the non-coagulated colloid removed by said removing means, and means for recirculating the collected non-coagulated colloid back to said nozzle means.

38. An apparatus as claimed in claim 30, wherein said coloring agent is a pigment and said means for treating said colloid therewith include means for admixing said pigment with said colloidal dispersion to obtain upon coagulation of the colloid said dots of colored, coagulated colloid, means being provided for treating said dots of colored, coagulated colloid with a colloid softening agent so as to maintain the colored, coagulated colloid in a softened state for enabling said pigment to be transferred onto said end-use support.

39. An apparatus as claimed in claim 30, wherein said coloring agent is a dye and said means for treating said colloid therewith include means for applying to the dots of coagulated colloid a liquid coloring medium containing said dye and having substantially the same constant temperature as said colloidal dispersion, to thereby obtain said dots of colored, coagulated colloid, means being provided for coating said end-use support with a wetting agent which is a solvent of said dye for enabling said dye to be transferred onto said end-use support.

40. An apparatus as claimed in claim 39, wherein said coloring medium means comprises shower or horizontal spray means for applying said coloring medium transversely of said belt, means being provided for collecting excess coloring medium drained off said belt by gravity as well as means for recirculating the collected coloring medium back to said shower or horizontal spray means after removal of residual non-coagulated colloid entrained with said coloring medium.

41. An apparatus as claimed in claim 30, further including means for removing any remaining coagulated colloid from said positive electrode active surface after transfer of said coloring agent onto said end-use support.

42. An apparatus as claimed in claim 30, wherein said negative and positive electrodes, said means for moving said endless elongated belt, said means for filling said electrode gap with said colloidal dispersion, said means for removing said non-coagulated colloid and said means for treating said colloid with said coloring medium are arranged together to define a printing unit, and wherein there are several said printing units each using a coloring agent of different color whereby to produce several differently colored images of coagulated colloid which are transferred onto said end-use support in superimposed relation to provide a polychromic image.

43. An apparatus as claimed in claim 42, wherein said end-use support is in the form of individual sheets and said means for bringing same into contact with the dots of colored, coagulated colloid comprises an endless conveyor belt moving along a closed horizontal path and having a vertically disposed transport surface, said conveyor belt being adapted to convey respective ones of said sheets into position for being successively imprinted with said colored images by said printing units.

44. An apparatus as claimed in claim 43, wherein the path defined by said conveyor belt includes a rectilinear portion and said printing units are arranged in tandem relation along said rectilinear path portion.

45. An apparatus as claimed in claim 43, wherein the path defined by said conveyor belt includes a pair of parallel rectilinear portions and said printing units are arranged along both said rectilinear path portions.

46. An apparatus as claimed in claim 42, wherein said end-use support is in the form of individual sheets and said means for bringing same into contact with the dots of colored, coagulated colloid comprises a vertically disposed conveyor roller, said printing units being arranged radially around said conveyor roller whereby to permit said conveyor roller to convey respective ones of said sheets into position for being successively imprinted with said colored images by said printing units.

47. An apparatus as claimed in claim 42, further including means for dividing the image to be reproduced into several differently colored images of reduced dimensions and means for scanning each differently colored image, said scanning means being operatively connected to the respective negative electrodes of said printing units via a central processing unit whereby to issue command signals for electrocally energizing selected ones of said negative electrodes.

48. An apparatus as claimed in claim 43, further including means for feeding respective ones of said sheets from a stack thereof to said transport surface of said conveyor belt so as to be imprinted with said colored images by said printing units, and means for removing said sheets once imprinted with said colored images from said transport surface.

49. An apparatus as claimed in claim 48, wherein said conveyor belt is displaced about an evacuated chamber having a perforated vertically extending wall, in frictional moving engagement with said perforated wall, said conveyor belt being perforated to permit said sheets to adhere by suction to said transport surface of said conveyor belt.

50. An apparatus as claimed in claim 49, wherein said sheet feeding means comprise movable pick-up means for engaging an outermost sheet of said stack and transporting same to a transfer position adjacent said conveyor belt whereat said sheet faces said transport surface of said conveyor belt, and blower means for applying air pressure against said sheet at said transfer position whereby to displace same onto said transport surface.

* * * * *

UNITED STATES PATENT AND TRADEMARK OFFICE
CERTIFICATE OF CORRECTION

PATENT NO. : 4,661,222

DATED : April 28, 1987

INVENTOR(S) : Adrien Castegnier

It is certified that error appears in the above-indentified patent and that said Letters Patent is hereby corrected as shown below:

Column 10, line 56, delete "recti" and insert --rectilinear path portions. The printing units 20' are essentially the same and operate in essentially the same manner as the printing unit 20 shown in Fig. 1, with the exception that the abrasive roller 44 of Fig. 1 has been replaced by a pair of abrasive pads 44'. In Fig. 14, on the other hand, in which only one of four printing units 20" is shown, the paper conveyor system 26" comprises a vertically disposed conveyor roller 46" and the printing units 20" are arranged radially around the conveyor roller 46" so that the roller 46" can convey individual sheets of paper into position for being successively imprinted with the colored images by the printing units 20". As shown, the printing unit 20" includes a fourth guide roller 38"' for rendering the unit more compact, the roller 38"' being recessed radially along a major length portion thereof to prevent deformation of the dots of colored, coagulated colloid formed on the surface 32 of the belt 34.--

Signed and Sealed this

Eleventh Day of June, 1996

Attest:

Bruce Lehman

BRUCE LEHMAN

*Attesting Officer* *Commissioner of Patents and Trademarks*